United States Patent
Routhier et al.

(10) Patent No.: US 9,420,243 B2
(45) Date of Patent: Aug. 16, 2016

(54) NATIVE THREE-COLOR IMAGES AND HIGH DYNAMIC RANGE IMAGES

(71) Applicant: Thomson Licensing, Issy de Moulineaux (FR)

(72) Inventors: Pierre Hughes Routhier, Los Angeles, CA (US); Thierry Borel, La Bouexiere (FR)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/401,581

(22) PCT Filed: May 17, 2013

(86) PCT No.: PCT/US2013/041490
§ 371 (c)(1),
(2) Date: Nov. 17, 2014

(87) PCT Pub. No.: WO2013/173669
PCT Pub. Date: Nov. 21, 2013

(65) Prior Publication Data
US 2015/0172608 A1   Jun. 18, 2015

Related U.S. Application Data

(60) Provisional application No. 61/688,657, filed on May 18, 2012.

(51) Int. Cl.
*H04N 9/097* (2006.01)
*G06T 3/40* (2006.01)
(Continued)

(52) U.S. Cl.
CPC .............. *H04N 9/097* (2013.01); *G06T 3/4015* (2013.01); *H04N 5/2258* (2013.01);
(Continued)

(58) Field of Classification Search
CPC .............. H04N 5/2355; H04N 5/2258; H04N 2209/046
See application file for complete search history.

(56) References Cited

U.S. PATENT DOCUMENTS 6,529,640 B1   3/2003   Utagawa et al.
6,778,220 B2   8/2004   Glenn
(Continued)

FOREIGN PATENT DOCUMENTS

JP   6261246   9/1994
KR   20120029761   3/2012
WO   WO2011032028   3/2011

OTHER PUBLICATIONS

Favaro, "A Split-Sensor Light Field Camera for Extended Depth of Field and Superresolution", Optics, Photonics, and Digital Technologies for Multimedia Applications II, Proc. of SPIE, vol. 8436, 2012.
(Continued)

*Primary Examiner* — Ahmed A Berhan
(74) *Attorney, Agent, or Firm* — Brian J. Dorini; Robert D. Shedd

(57) ABSTRACT

Various implementations provide color images, including, for example, RGB images and/or HDR images. In one particular implementation, a color image is created using a first set of color values captured from multiple sensors. Multiple pixel locations of the color image have a color value for three colors that are captured from the multiple sensors. A lens assembly passes light to the multiple sensors. An HDR image is created using a second set of color values captured from the multiple sensors. Another implementation includes a lens assembly and multiple sensors arranged to receive light though the lens assembly. A first set of color values captured from the multiple sensors can be assembled to provide three color values for multiple pixel locations. A second set of color values captured from the multiple sensors can be interpolated to provide an HDR image.

21 Claims, 8 Drawing Sheets

(51) Int. Cl.
 H04N 9/09 (2006.01)
 H04N 5/235 (2006.01)
 H04N 5/225 (2006.01)
(52) U.S. Cl.
 CPC .............. *H04N 5/2355* (2013.01); *H04N 9/09* (2013.01); *G06T 2207/10024* (2013.01); *G06T 2207/20208* (2013.01)

(56) References Cited

U.S. PATENT DOCUMENTS

| | | | |
|---|---|---|---|
| 6,852,991 B2 | 2/2005 | Pastor et al. | |
| 7,095,434 B1* | 8/2006 | Ikeda | 348/219.1 |
| 7,751,694 B2 | 7/2010 | Cho et al. | |
| 7,961,398 B2 | 6/2011 | Tocci | |
| 8,031,243 B2 | 10/2011 | Imai et al. | |
| 2005/0280727 A1* | 12/2005 | Sato | 349/294 |
| 2010/0053385 A1 | 3/2010 | Choe et al. | |
| 2010/0328780 A1 | 12/2010 | Tocci | |
| 2011/0211077 A1 | 9/2011 | Nayar et al. | |
| 2012/0105690 A1 | 5/2012 | Waqas et al. | |

OTHER PUBLICATIONS

Haga et al., "Capturing MultiView 3D Using a lenticular Lens", Si International 2011, 2011.

Lee et al., "Development of Filter Exchangeable 3CCD Camera for Multispectral Imaging Acquisition", Proc. of SPIE, vol. 8369, 2012.

Kise et al., "Multispectral Imaging System for Interchangeable Filter Design", Computers and Electronics in Agriculture, vol. 72, 2010, pp. 61-68.

Yamashita et al., "Wide Dynamic Range Camera Using a Novel Optical Beam Splitting System", Sensors and Camera Systems for Scientific, Industrial, and Digital Photography Applications III, Proc. of SPIE, vol. 4669, 2002.

McGuire, et al. "Optical Splitting Trees for High-Precision Monocular Imaging" Computer Graphics and Applications, IEEE 2007, pp. 32-42.

Aggarwal et al. "Split Aperture Imaging for High Dynamic Range" University of Illinois at Urbana-Champaign 2001, pp. 10-17.

International Search Report Dated Jul. 12, 2013.

* cited by examiner

FIG. 7

| | | | | | | | |
|---|---|---|---|---|---|---|---|
| RB | GB | Ⓡ B 736 | GB | GB | BR | B Ⓖ 754 | GB |
| GR | Ⓑ R 732 | GR Interpolate B 630 | BR | RB | Ⓖ R 754 | BR Interpolate G 650 | BR |
| BR | BG | Ⓑ R 738 | BG | BR | B Ⓖ | RG | B Ⓖ |
| RG | RB | RG | RB | RG | RB | Ⓡ G 758 | RB |
| 730 | | | | 750 | | | |

| | | | | | | | |
|---|---|---|---|---|---|---|---|
| RB | Ⓖ B 726 | RB | GB | RB | BⓇ 746 | RB | GB |
| GR | BR Interpolate G 620 | Ⓖ R 724 | BR | GR | BG Interpolate R 640 | BⓇ 744 | BR |
| BR | B Ⓖ 728 | BR | BG | BR | BⓇ 742 | BR | BG |
| RG | RB | RG | RB | RG | Ⓡ B 748 | RG | RB |
| 720 | | | | 740 | | | |

NATIVE THREE-COLOR IMAGES AND HIGH DYNAMIC RANGE IMAGES

CROSS REFERENCE TO RELATED APPLICATIONS

This application claims the benefit, under 35 U.S.C. §365 of International Application PCT/US13/41490, filed May 17, 2013, which was published in accordance with PCT Article 21(2) on Nov. 21, 2013 in English and which claims the benefit of U.S. provisional patent application No. 61/688,657, filed May 18, 2012.

TECHNICAL FIELD

Implementations are described that relate to image capture and/or processing. Various particular implementations relate to capturing and/or processing native three-color images and high dynamic range ("HDR") images.

BACKGROUND

Film producers and other content creators have a range of choices available for capturing content. One option is to use red-green-blue ("RGB") images. The RGB images can be, for example, interpolated or native. Another option is to use HDR images. Frequently, a content creator will desire to use different types of images in different portions of the content. For example, a film producer may desire to shoot a few selected scenes in a movie using HDR images. To achieve that desire, the content creator typically has to use a different camera (or cameras) for each type of image. For example, the film producer may use a first camera to capture native RGB images, and use a second camera and a third camera to capture HDR images.

SUMMARY

According to a general aspect, a color image is created using a first set of color values captured from multiple sensors. Multiple pixel locations of the color image have a color value for three colors. The three color values are captured from the multiple sensors, and a lens assembly passes light to the multiple sensors. An HDR image is created using a second set of color values captured from the multiple sensors.

According to another general aspect, an apparatus includes a lens assembly and multiple sensors arranged to receive light though the lens assembly. A first set of color values captured from the multiple sensors can be assembled to provide three color values for multiple pixel locations. A second set of color values captured from the multiple sensors can be interpolated to provide an HDR image.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

FIG. 7 provides a pictorial diagram depicting, for each of the colors to be interpolated in FIG. 6, an example of four pixel locations that can be used in the interpolation.

DETAILED DESCRIPTION

Figure 1:
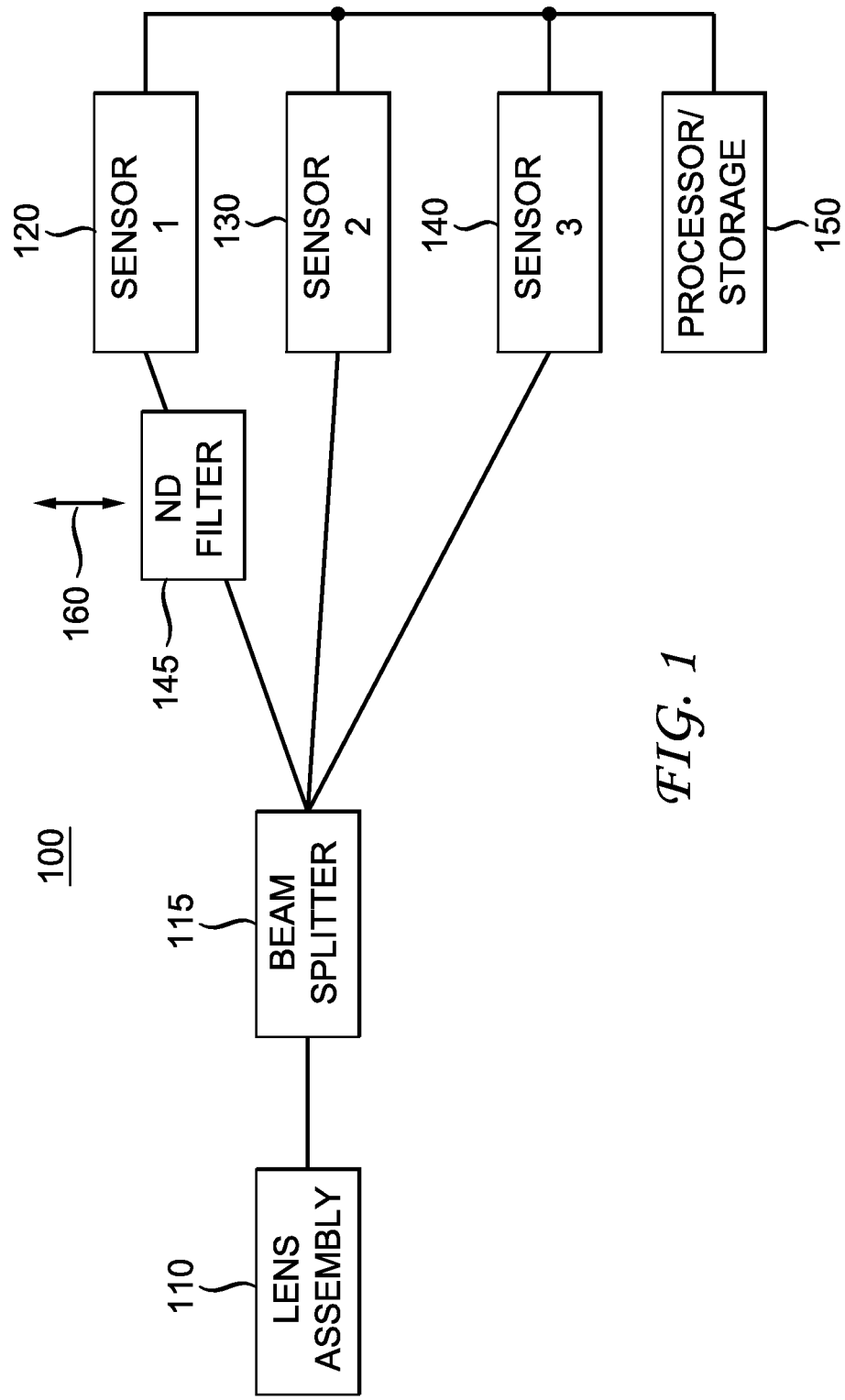
FIG. 1 provides a block diagram depicting an example of a camera.

At least one implementation described in this application is directed towards a method and apparatus for creating a native RGB image and an HDR image using the same lens assembly (often referred to, in this application, simply as the lens).

In the implementation, the lens assembly passes light to three sensors, and the data captured from the three sensors is used to generate both a native RGB image and an HDR image. In one implementation in particular, the present application describes how using three sensors and a proposed 3×2×4 matrix (see FIG. 2), instead of a classic 2×2 Bayer matrix, enables a camera to provide native RGB as well as very high quality HDR images within the same device, using a single lens assembly.

A Bayer matrix (or "Bayer pattern") is a filter pattern that typically has 25% red, 50% green, and 25% blue. Bayer patterns are often 2×2 matrices that are repeated (also referred to as tiled) as needed to cover a particular resolution. One example is shown below by the top 2×2 portion of sensor 1 in FIG. 2. That 2×2 portion has 1 red (positioned at the first row, second column), 2 greens (positioned at the first row, first column; and the second row, second column), and 1 blue (positioned at the first row, first column). A Bayer pattern sensor generally refers to a sensor that has a Bayer pattern filtering the light that enters the sensor. The Bayer pattern is, in various implementations, applied or attached to the sensor in a manner well known to those of skill in the art.

A "native RGB" (or "full native RGB") image refers to an image for which the captured data includes a red component, a green component, and a blue component for every pixel, or substantially every pixel, in the image. The color components are also referred to as "color values", or "values". The color values are, in various implementations, an 8-bit integer from 0 to 255, for each of red, green, and blue.

The term "native" indicates that all components (for example, the R, the G, and the B) are captured, as opposed, for example, to being interpolated. As a result, the term "native" can be applied to other types of images, such as, for example, a native three-color image that refers to any three colors being captured. Other examples include a native YUV image.

An HDR image refers to an image that has a greater dynamic range, between the lightest and darkest areas, than is typically possible. The dynamic range typically relates to the range of luminance values for the image.

Source content that has a high dynamic range often suffers from lost detail in either the bright areas or the dark areas. An HDR image is able to provide some of that lost detail. Typically, an HDR image is generated by stitching together component images (or portions of images) that are captured at different luminance levels.

Many implementations produce HDR images that do not actually increase the range of luminance values that can be represented (for example, the luminance is represented by an 8-bit value regardless of whether the HDR processing is used). However, some of these implementations use processing techniques (for example, filtering) to move a range of luminance values (for example, high luminance values) to a different luminance range at which the differences in luminance can be represented better. For example, high luminance can often saturate a sensor, such that an entire region is given luminance values at or near the high-luminance end of the luminance range (for example, 255). Several implementations apply a filter to reduce the luminance, and the result is that the luminance values are no longer grouped around a single number (255) but are spread out over a range. Thus, more detail is provided.

A full native RGB image can be captured using three sensors, each of which independently captures the red, green, and blue information. A beam splitter mechanism is applied between the lens assembly and the sensors so that, typically, each sensor receives the same amount of luminance in each of the three primary colors.

Using such a device, it does not appear possible to create HDR images, at least not if the level of luminance which reaches each sensor is to be identical. In order to have multiple luminance values, multiple 3-sensor devices with different levels of luminance would appear to be needed. Using multiple devices, however, is expensive and impractical.

It is also possible to create HDR images with a single lens assembly and within a single device using three sensors equipped with Bayer-type chromatic filters by applying multiple Neutral Density ("ND") filters in front of each sensor. Such a device has great value on its own. However, if such a system is used, it does not appear possible to obtain a native RGB image with the same device, because the Bayer pattern requires pixel interpolation and cannot be combined in a full native RGB combination for each pixel. That is, even though there are three Bayer patterns, the three Bayer patterns are all the same. Adding the second and third Bayer-patterned sensors does not provide any additional or new information. Rather, the second and third Bayer-patterned sensors replicate the color information from the first Bayer-patterned sensor. Accordingly, a given pixel location does not get any new color information from the second and third Bayer-patterned sensors. As a result, using Bayer-patterned sensors, no pixel location has more than one color value and, by definition, is not native RGB. Rather, the captured color values for a given color are used in an interpolation algorithm to provide interpolated color values (for the given color) for all pixel locations. However, interpolation does not result in native RGB because the interpolated color values were not captured color values.

Various implementations described in this application, however, provide a device which enables a filmmaker (or other content creator) to obtain both HDR and native RGB capabilities within the same device (typically, a camera), using a single lens assembly. This capability would make using these types of effects (HDR and native RGB) more affordable and productive than using two or more different, single purpose cameras.

Referring to FIG. 1, a camera 100 is shown that allows both HDR images and native RGB images to be captured. The camera 100 includes a lens assembly 110. The lens assembly 110 includes, in certain implementations, a single lens. However, other implementations include multiple lenses in the lens assembly 110.

The lens assembly 110 passes light to a beam splitter 115. The beam splitter 115 passes the light to three sensors including a first sensor 120, a second sensor 130, and a third sensor 140. The light that is passed can vary by implementation. However, in at least one implementation, the light is passed in equal amounts to each of the sensors 120, 130, and 140.

The camera 100 includes an ND filter 145 arranged between the beam splitter 115 and the first sensor 120. The ND filter 145 has, in different implementations, different filtering strengths. An ND filter, as is well known, reduces and/or modifies the intensity of all wavelengths or colors of light substantially equally. Other filters are used in different implementations, but non-ND filters will typically have an effect on the color that is captured by the downstream sensor (such as the first sensor 120).

The data captured by the sensors 120, 130, and 140 is provided to a downstream device. The downstream device in the camera 100 is shown as a processor or storage device 150. Certain implementations of the camera 100 merely capture the data, and in such implementations the downstream device is a storage device 150. Other implementations also, or additionally, perform some processing on the captured data, and in such implementations the downstream device is a processor 150 or a combination processor and storage device 150.

The camera 100 is also able to selectively remove, and insert, the ND filter 145. This control is indicated by a two-way arrow 160. Such control can be achieved by, for example, having a slot for the ND filter 145 to be removed and inserted by the camera operator, or having a hinge internal to the camera 100 that moves the ND filter 145 in and out of a position that filters the light impinging the sensor 1 120.

With the ND filter 145 removed from the camera 100, the camera 100 is able to capture data usable to create native RGB images, as will be explained in more detail with respect to FIGS. 2-4. Additionally, with the ND filter 145 inserted into the camera 100, the camera 100 is able to capture data usable to create HDR images, as will be explained in more detail with respect to FIGS. 2 and 5-8. The ability to selectively capture data for use in generating native RGB images or HDR images is described with respect to FIG. 9.

As noted above, in order to provide full native RGB and HDR in a camera, the implementation of FIG. 1 uses three sensors 120, 130, and 140 with a beam splitter mechanism 115 that splits the incoming light into three equal-intensity beams. As can be seen, the camera 100 differs from standard cameras that include only a single sensor.

Further, the camera 100 differs from standard cameras that use only the classic single sensor, 2×2 Bayer patterns. Rather, the camera 100 uses a new three-sensor, 3×2×4 chromatic pixel pattern.

Figure 2:
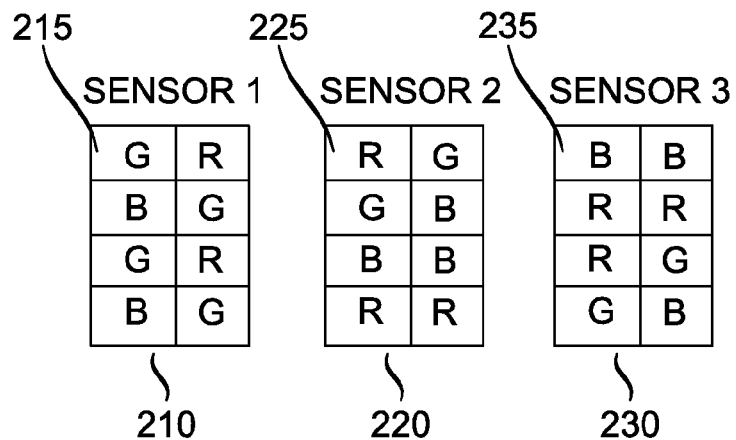
FIG. 2 provides a pictorial diagram depicting an example of three RGB sensors.

Referring to FIG. 2, the new 3×2×4 pattern is shown. The "3" in "3×2×4" reflects the fact that FIG. 2 includes 3 sensor patterns, including a first sensor pattern 210, a second sensor pattern 220, and a third sensor pattern 230. The "2×4" reflects the fact that the sensor patterns 210, 220, and 230 are all described by a repeating 2×4 matrix (or pattern). Thus, the first sensor pattern 210 (and similarly for the sensor patterns 220 and 230) is intended to be repeated across an entire sensor.

For example, in one implementation of the camera 100, the first sensor pattern 210 is repeated across the entire first sensor 120, and the first sensor pattern 210 acts as a filter that passes light to the first sensor 120 having a wavelength corresponding to the colors shown on the first sensor pattern 210. In particular, in this implementation, the first sensor pattern 210 includes a top left portion 215 labeled G for "green", the second sensor pattern 220 includes a top left portion 225 labeled R for "red", and the third sensor pattern includes a top left portion 235 labeled B for "blue". In this implementation, (i) the first sensor 120 will receive green light in the area that is covered by the top left portion 215, (ii) the second sensor 130 will receive red light in the area that is covered by the top left portion 225, and (iii) the third sensor 140 will receive blue light in the area that is covered by the top left portion 235. In various implementations, the areas of the sensors 120, 130, and 140 that are covered by the top left portions 215, 225, and 235, respectively, will correspond to a pixel in the images captured by the sensors 120, 130, and 140.

It should be clear that the first sensor pattern 210 is actually described by a repeating 2×2 pattern. For convenience, however, a 2×4 area is used, because the second sensor pattern 220 and the third sensor pattern 230 are described by the 2×4 areas shown in FIG. 2. It should also be clear that that first sensor pattern 210 is a Bayer pattern. Thus, in this implementation, the 2×2 Bayer pattern of standard cameras is replaced by a 3×2×4 pattern that includes the 2×2 Bayer pattern.

Figure 3:
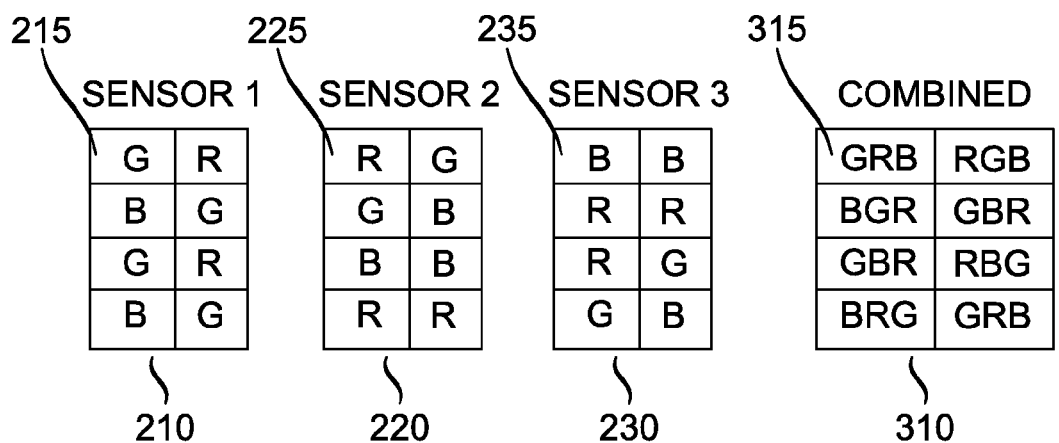
FIG. 3 provides a pictorial diagram depicting an example of the three RGB sensors of FIG. 2 being combined.

Referring to FIG. 3, the three sensor patterns 210, 220, and 230 are shown again. FIG. 3 also includes a combined pattern 310. In the combined pattern 310, the corresponding locations of the three sensor patterns 210, 220, and 230 are combined. "Combining" refers to assembling or collecting or aggregating the color values from the three sensor patterns 210, 220, and 230. Thus, the color values in each of the top left portions 215, 225, and 235 of the sensor patterns 210, 220, and 230, respectively, are included in a top left portion 315 of the combined pattern 310. The top left portion 315 lists GRB because it includes (combines) the G from the top left portion 215 of the first sensor pattern 210, the R from the top left portion 225 of the second sensor pattern 220, and the B from the top left portion 235 of the third sensor pattern 230.

The top left portions 215, 225, and 235 each capture light from the same area (a "top left" area) of a source image that is incident upon the lens assembly 110. Thus, that "top left" area in the source image being filmed by the camera 100 is captured in green, red, and blue by the three sensors 210, 220, and 230, respectively. The combined pattern 310 reflects this fact by listing GRB in the top left portion 315.

The other portions of the combined pattern 310 are derived in a similar manner. Specifically, the color values from corresponding locations in the three sensor patterns 210, 220, and 230 are combined in the corresponding location of the combined pattern 310. It is clear from examining the combined pattern 310 that every location of the combined pattern 310 has all three primary colors of red, green, and blue. Thus, by combining the images captured by each of the three sensors 120, 130, and 140 (having the sensor patterns 210, 220, and 230, respectively), a native RGB image can be generated.

The process of combining the individual sensor images to form the native RGB image can be performed, for example, in the processor 150. This process includes, for example, collecting all of the red, green, and blue color values for each pixel location into a data structure that can be accessed to display the resultant native RGB image. Accordingly, as described above, by combining the three sensor values using, for example, chromatic pixel-sized filters in this 3×2×4 pattern, we see that each combined pixel has a capture for R, G and B, and therefore offers native RGB capture.

Other implementations use a second sensor pattern and a third sensor pattern that are different from those shown in FIG. 3. Various implementations use any of the various sensor patterns that can be assembled to supply the colors that are missing from the standard Bayer pattern as presented in the sensor pattern 210. Various implementations do not use three-colored sensor patterns for all of the sensor patterns, such as, for example, by putting the Gs (or the Rs, or the Bs) from the second sensor pattern 220 into the third sensor pattern 230. Another implementation can be accomplished with 2×2 sensor patterns in which the second sensor pattern is only the top half of the second sensor pattern 220, and the third sensor pattern is only the top half of the third sensor pattern 230.

Figure 4:
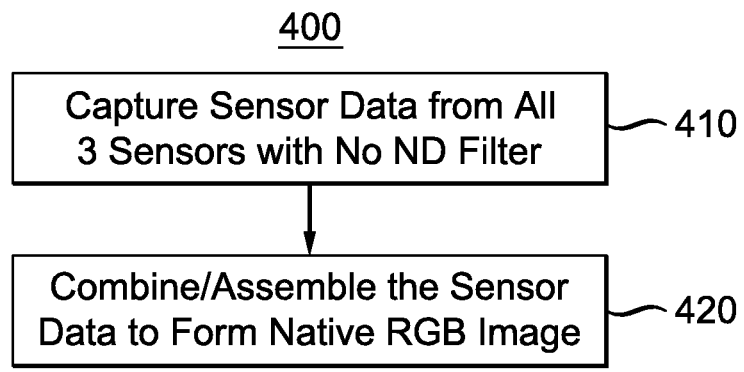
FIG. 4 provides a flow diagram depicting an example of a process for forming a native RGB picture.

Referring to FIG. 4, a process 400 is provided for forming a native RGB image. A process for forming a native RGB image has essentially been described above with respect to FIGS. 2-3. However, a specific process flow is now provided for a generic process.

The process 400 includes capturing sensor data from three sensors with no ND filter (410). In at least one implementation, the operation 410 is performed by the camera 100 with the ND filter 145 removed. In one such implementation, the operation 410 is performed by capturing image data from the sensors 120, 130, and 140, through the sensor patterns 210, 220, and 230, respectively.

The process 400 includes combining the captured sensor data to form a native RGB image (420). Continuing the implementation discussed above with respect to the operation 410, the operation 420 is performed, for example, by combining the captured image data from the sensors 120, 130, and 140 to form a native RGB image.

Referring to FIGS. 5-8 (as well as previously described FIGS. 1-3), we now describe one or more implementations for creating HDR images. Various such implementations can be performed by the camera 100 with the ND filter 145 inserted into the camera 100.

The first sensor 120, with the first sensor pattern 210, is considered, in several implementations, as an "autonomous" sensor. This is because the first sensor 120, with the first sensor pattern 210, can be used to generate an interpolated RGB image. This follows from the fact that the first sensor pattern 210 is a version of a classic Bayer pattern, and can provide a full (but not native) RGB image through pixel interpolation, as is known in the art.

The second sensor 130 and the third sensor 140 are considered, in several implementations, as "complementary" sensors. This is because captured images from the sensors 130 and 140, using the sensor patterns 220 and 230, respectively, can be combined in a complementary manner to interpolate a full resolution image. The combination of these captured images allows, in various implementations, better interpolation (for example, quincunx interpolation for all 3 colors) than would be possible without combining the captured images.

However, other implementations use the second sensor 130 as an autonomous sensor and interpolate the second sensor 130 to generate an interpolated full RGB image. Similarly, in various implementations the third sensor 140 is used as an autonomous sensor and is interpolated to generate an interpolated full RGB image.

Figure 5:
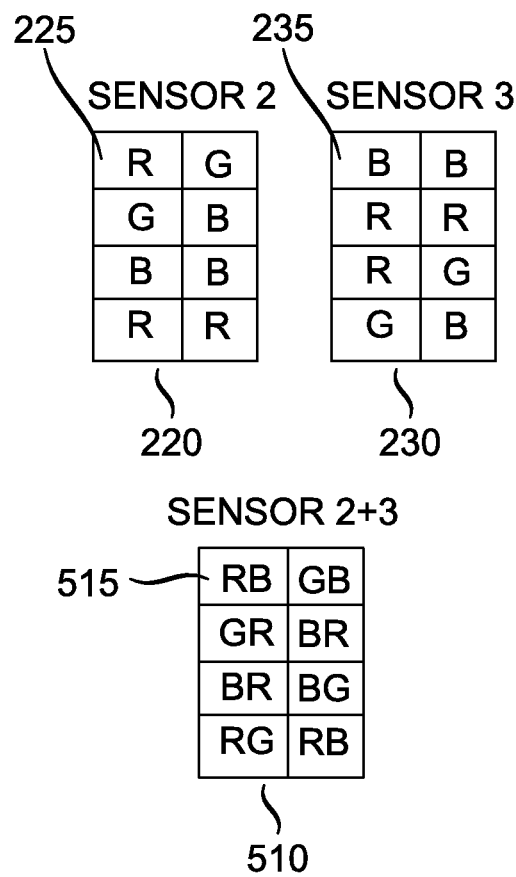
FIG. 5 provides a pictorial diagram depicting an example of sensors 2 and 3 from FIG. 2 being combined.

Referring to FIG. 5, the sensor patterns 220 and 230 are shown again. Additionally, a combination pattern 510 is provided that is the combination of the sensor patterns 220 and

230. For example, a top left portion 515 of the combination pattern 510 lists the color values RB for "red" and "blue". The "R" of the top left portion 515 is included because the top left portion 225 of the second sensor 220 lists the color value R. The "B" of the top left portion 515 is included because the top left portion 235 of the third sensor 230 lists the color value B. The other portions of the combination pattern 510 are derived in a similar manner. Specifically, the color values from corresponding locations in the two sensor patterns 220 and 230 are combined in the corresponding location of the combination pattern 510.

Figure 6:
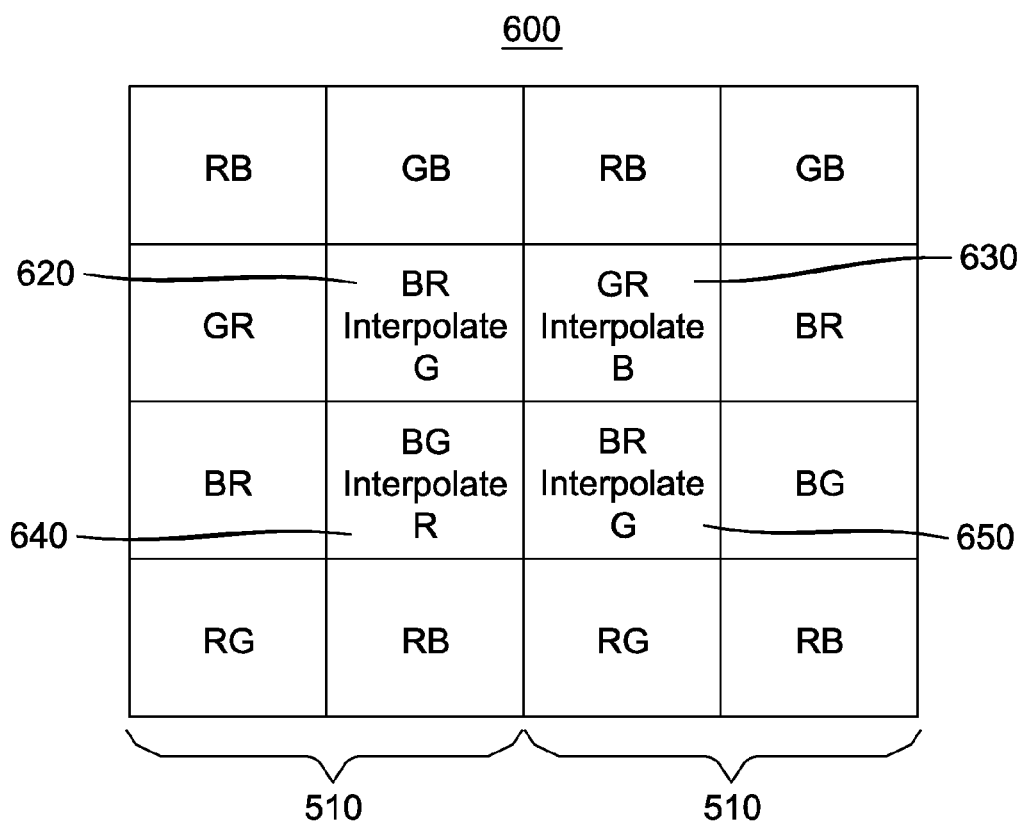
FIG. 6 provides a pictorial diagram depicting an example of colors to be interpolated in four pixel locations of a larger version of the combination of FIG. 5.

Referring to FIG. 6, an extended pattern 600 is provided. The extended pattern 600 includes two repeated occurrences of the combination pattern 510. As can be seen, a first occurrence of the combination pattern 510 includes the left two columns of the extended pattern 600, and a second occurrence of the combination pattern 510 includes the right two columns of the extended pattern 600.

The extended pattern 600 includes interior locations 620, 630, 640, and 650, which each correspond to individual pixels in various implementations. An "interior" location in this example is a pixel location that is not an edge pixel. Examining the interior locations 620-650, we see that each has two color values.

Thus, to produce a full RGB image, one color value would be interpolated for the interior locations 620-650. As illustrated, (i) for interior location 620, a G would be interpolated, (ii) for interior location 630, a B would be interpolated, (iii) for interior location 640, an R would be interpolated, and (iv) for interior location 650, a G would be interpolated. This pattern of identifying the color value that is missing can be continued for all locations, whether interior locations or not. Additionally, by repeating (tiling) more occurrences of the combination pattern 510, the extended pattern 600 can be increased in size to correspond to any size sensor.

Referring to FIG. 7, four separate versions of the extended pattern 600 are provided, and these four versions indicate an interpolation strategy. The four versions include (i) a first interpolation pattern 720 corresponding to the interior location 620, (ii) a second interpolation pattern 730 corresponding to the interior location 630, (iii) a third interpolation pattern 740 corresponding to the interior location 640, and (iv) a fourth interpolation pattern 750 corresponding to the interior location 650.

As shown in each of the interpolation patterns 720-750, the missing color value from the interior locations 620-650 is present in the immediately adjacent locations to the left, right, top, and bottom. This is shown, for the interpolation pattern 720, by the circles 722, 724, 726, and 728, which highlight a G in the corresponding locations (for example, pixels). This is shown, for the interpolation pattern 730, by the circles 732, 734, 736, and 738, which highlight a B in the corresponding locations. This is shown, for the interpolation pattern 740, by the circles 742, 744, 746, and 748, which highlight an R in the corresponding locations. This is shown, for the interpolation pattern 750, by the circles 752, 754, 756, and 758, which highlight a G in the corresponding locations.

It is clear, at least for the interpolation patterns 730 and 740, that circles could have been drawn around the missing color value in all adjacent locations including the diagonally adjacent locations. That is, for example, in the interpolation pattern 730, all eight neighboring locations that surround the interior location 630 have a B color value. The same applies to the interpolation pattern 740, in which all eight neighboring locations that surround the interior location 640 have an R color value.

However, it is also clear that even for larger versions of the extended pattern 600 (based on the combination pattern 510), and thereby larger versions of the interpolation patterns 720, 730, 740, and 750, all interior locations will have their missing color value present in their neighboring left, right, top, and bottom locations.

Thus, it is possible to use a common interpolation algorithm for all interior locations in an image captured from a sensor having a version of the combination pattern 510. The common interpolation algorithm can be based, for example, on the adjacent locations to the left, right, top, and bottom. One such interpolation algorithm is a quincunx pixel interpolation algorithm that can be used to interpolate the missing color values. Any algorithm that uses the four adjacent locations to the left, right, top, and bottom can be used, however.

An advantage of this implementation (using the patterns of FIGS. 5-7) compared to using a Bayer pattern is that for each missing pixel value of R, G and B, a full quincunx pattern is available for pixel interpolation. In contrast, when using a Bayer pattern, a full quincunx pattern is available for pixel interpolation only for G, and not for R and B. Having a full quincunx pattern available for pixel interpolation for all three colors should result in a higher quality interpolated image, as compared to using only a Bayer pattern. This quality can be achieved using a single interpolation algorithm, which also provides a complexity advantage compared to implementations that use multiple interpolation algorithms. This comparison involves a single sensor using a Bayer pattern, but even if three sensors are used that all have a Bayer pattern, the result is the same because the Bayer patterns would be identical and not provide any additional color information.

In the case of HDR, although multiple scenarios are possible to capture the whole luminance range with different ND filters applied, at least one particular implementation allows an innovative possibility. The first sensor pattern 210 is of a lower resolution, at least when compared to the combination of the second sensor pattern 220 and the third sensor pattern 230, because it is interpolating pixels in a classic Bayer scheme. Therefore, the first sensor pattern 210 can be used with a high value ND filter (filtering out luminance) to provide clear pixels (that is, pixel values having useful luminance information distributed over a range that allows details and differences to be seen by a viewer) in high luminance areas of the picture that would ordinarily saturate the sensors. Additionally, the combination of the second sensor pattern 220 and the third sensor pattern 230, with no ND filter applied, can provide a higher resolution, "reference" image for which the camera is set. Because the two sensor patterns 220 and 230 are used to capture this "reference" image, the combination pattern 510 can be generated, and full quincunx pixel interpolation is available for all three primary colors.

In this particular implementation, the lower resolution image and the higher resolution "reference" image are both generated based on the three captured images. These two different resolution images are then combined to form the HDR image. This combined HDR image will have more luminance and be of a superior resolution than using three independent Bayer-type sensors. The greater luminance is provided because the ND filter allows a greater luminance range to be meaningfully captured and supplies more useful luminance information for the image. The superior resolution is provided because of the improved interpolation, as compared to standard interpolation that is possible using a Bayer pattern.

Figure 8:
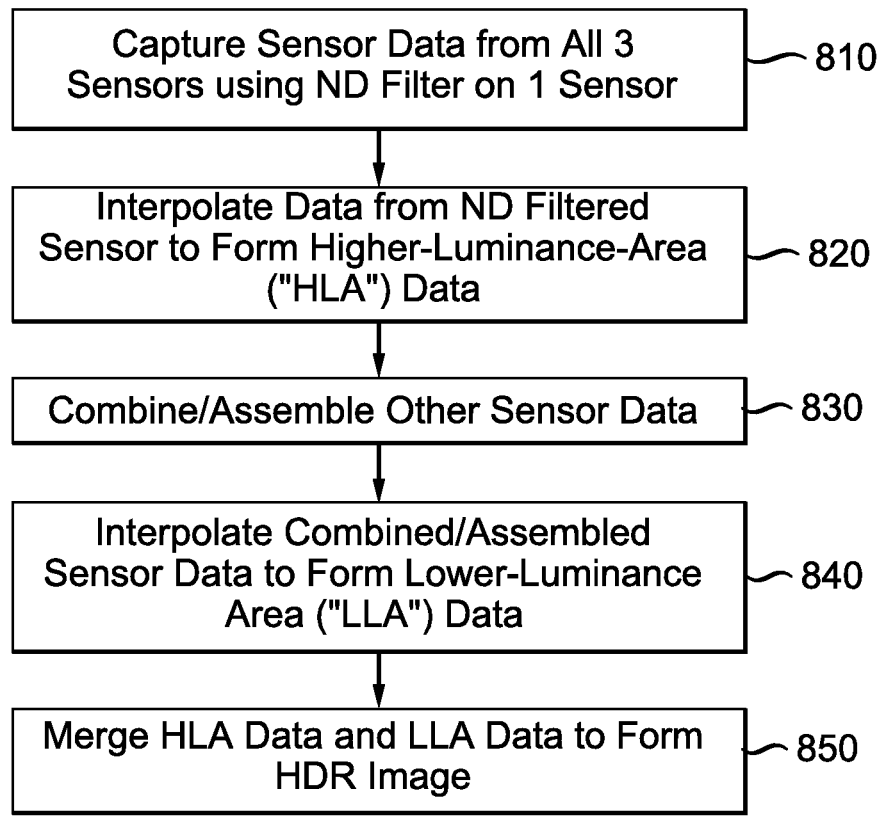
FIG. 8 provides a flow diagram depicting an example of a process for forming an HDR picture.

Referring to FIG. 8, a process 800 is provided for forming an HDR image. A process for forming an HDR image has essentially been described above with respect to FIGS. 5-7. However, a specific process flow is now provided for a generic process.

The process 800 includes capturing sensor data from three sensors with an ND filter applied to one of the sensors (810). In at least one implementation, the operation 810 is performed by the camera 100 with the ND filter 145 inserted. In one such implementation, the operation 810 is performed by capturing image data from the sensors 120, 130, and 140, through the sensor patterns 210, 220, and 230, respectively, and with the ND filter 145 inserted between the beam splitter 115 and the first sensor 120.

The process 800 includes interpolating the image data captured from the ND-filtered sensor to form as output higher-luminance-area ("HLA") data (820). The "data" can be, for example, all or part of an entire frame. The "higher-luminance-area" refers to areas of the original source content, before ND-filtering, that have higher luminance values. Of course, those same areas will also have higher luminance values in the ND-filtered version of the original source content, as compared to the rest of the ND-filtered version. The HLA "data" can typically be considered to be a remapping of the original color values of the HLA so that those values occupy a larger portion of the dynamic range that is available.

The ND filter will reduce the overall luminance of the input source content, which will reduce the color values that are captured by the sensor. This reduction typically causes low color values of the input source content to be condensed into the low end of the dynamic range of the sensor. This reduction also typically causes the high color values of the input source content to be spread out across the dynamic range of the sensor.

Continuing the implementation discussed above with respect to the operation 810, the operation 820 is performed by, for example, the processor 150. In this implementation, the processor 150 performs, for example, a standard interpolation algorithm that is used for Bayer pattern images. The interpolation is performed on the captured image or data from the first sensor 120, through the first sensor pattern 210. The output image is, in such an implementation, an entire interpolated image. In this implementation, the HLA data is part of the interpolated image.

The process 800 includes combining data captured from the other sensors (830). Continuing the implementation discussed above with respect to the operations 810-820, the operation 830 is performed by, for example, the processor 150. In this implementation, the processor 150 combines the captured image data from the sensors 130 and 140, through the sensor patterns 220 and 230. No ND filter is used in front of either of the sensors 130 or 140, although other implementations do use ND filters of various strengths. The result is an image, or image data, that has values for the colors indicated by the combination pattern 510.

The process 800 includes interpolating the combined sensor data from the operation 830, to form lower-luminance-area ("LLA") data (840). The "data" can be, for example, part of an entire image or simply a stand-alone set of data. The "lower-luminance-area" refers to areas of the original source content, which is also the captured image data if there is no ND filter, that have lower luminance values. In typical implementations, the LLA will have color values that are effectively represented with the dynamic range of the sensor.

Continuing the implementation discussed above with respect to the operations 810-830, the operation 840 is performed by, for example, the processor 150. In this implementation, the processor 150 performs, for example, a quincunx interpolation algorithm as discussed with respect to FIG. 7 to produce the reference image for a final HDR image. In this implementation, the LLA data is part of the reference image.

The process 800 includes merging the HLA data and the LLA data to form an HDR image (850). The HLA data includes remapped (due to the ND filter) color values for portions of the original content source having a higher luminance. The LLA data includes color values for portions of the original content source having a lower luminance. Merging these two sets of data provides an image that has color values representing both lower-luminance portions of the original source content and higher-luminance portions of the original source content. Moreover, the higher-luminance portions are typically represented over a larger dynamic range because of the ND filter, such that the detail of the higher-luminance portions is more visible to a viewer.

Continuing the implementation discussed above with respect to the operations 810-840, the operation 850 is performed by, for example, the processor 150. The processor 150 can perform the merging of the operation 850 in a variety of ways. In one implementation, the processor 150 determines which portions of the original content source are "high" luminance areas, such as, for example, a sky, or a view from a window. The areas identified include, for example, objects or features that have an average luminance above a particular threshold. The implementation then extracts HLA data from those "high" luminance locations and copies the extracted data over to co-located positions of the LLA data to form the HDR image. Other implementations extract data from the LLA data (either the non-high luminance areas, or identified low-luminance areas) and copy it into the HLA data to form the HDR image. Other implementations, for example, extract data from both the LLA data and the HLA data and merge the two extractions in a new image.

In various implementations, the HLA data and/or the LLA data includes an entire frame. In other implementations, however, the HLA data and/or the LLA data is just a small portion of a frame.

Figure 9:
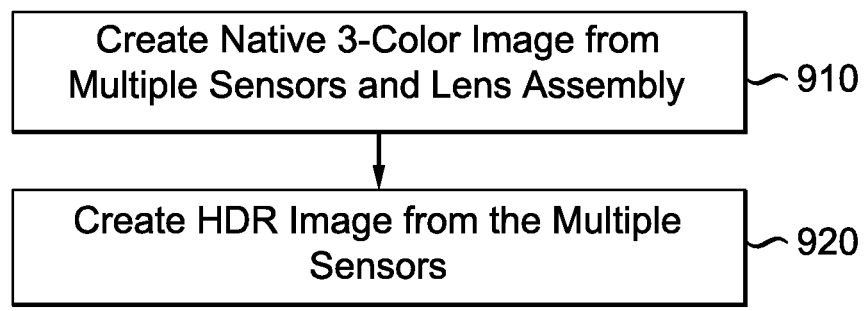
FIG. 9 provides a flow diagram depicting an example of a process for forming a native RGB picture and an HDR picture.

Referring to FIG. 9, a process 900 is provided for forming a native three-color image and an HDR image. The three-color image is, in various implementations, an RGB image. Other colors are used in different implementations, however, as discussed elsewhere in this application. An example of such a process for forming these two images has essentially been described above with respect to FIGS. 2-8. However, a specific process flow is now provided for a generic process.

The process 900 includes creating a native three-color image from multiple sensors and a single lens assembly (910). In at least one implementation, the operation 910 includes creating an RGB image using a first set of color values captured from multiple sensors. In this implementation, multiple pixel locations of the RGB image have a color value for R, G, and B that is captured from the multiple sensors, and a single lens assembly passes light to the multiple sensors.

In another implementation, the operation 910 is performed by the camera 100 with the ND filter 145 removed, with the sensors patterns 210, 220, and 230 being used with the sensors 120, 130, and 140, respectively. The camera 100 performs the operation 910 using, for example, the process 400.

The process 900 includes creating an HDR image from the multiple sensors (920). In at least one implementation, the operation 920 includes creating an HDR image using a second set of color values captured from the multiple sensors. In several such implementations, the HDR image includes a higher-luminance area component and a lower-luminance area component.

In another implementation, the operation 920 is performed by the camera 100 with the ND filter 145 inserted, with the sensor patterns 210, 220, and 230 being used with the sensors 120, 130, and 140, respectively. The camera 100 performs the operation 920 using, for example, the process 800. The process 900 is able to create both a native RGB image and an HDR image with the same set of sensors. It should be clear that this also enables a single camera, including the set of sensors and a single lens assembly, to be used to capture both native RGB and HDR images. Such a camera has the ability to selectively capture data for use in generating native RGB images or HDR images.

Various implementations are achieved that involve adding additional features to the process 900. Several variations of the process 900 include one or more of the features in the following implementations.

In another implementation, the process 900 is further defined such that the multiple sensors include three sensors that are configured to acquire multiple colors and that use filters having different color patterns from each other.

In another implementation, the process 900 is further defined such that the three different color patterns include (i) a first pattern that includes red ("R"), green ("G"), and blue ("B"), (ii) a second pattern that includes R, G, and B, and (iii) a third pattern that includes R, G, and B.

In another implementation, the process 900 is further defined such that creating the HDR image includes interpolating the second set of color values to have R, G, and B for multiple pixel locations of the HDR image.

In another implementation, the process 900 is further defined such that creating the HDR image includes interpolating the second set of color values to have R, G, and B for all interior pixel locations of the HDR image.

In another implementation, the process 900 is further defined such that the HDR image includes a higher-luminance area component having pixel values derived from corresponding locations in a first image, and includes a lower-luminance area component having pixel values derived from corresponding locations in a second image.

In another implementation, the process 900 is further defined such that (i) the multiple sensors include a Bayer-pattern sensor, (ii) the second set of color values includes color values captured from the Bayer-pattern sensor, (iii) creating the HDR image includes creating the higher-luminance area component, and (iv) creating the higher-luminance area component includes interpolating the color values in the second set of color values captured from the Bayer-pattern sensor.

In another implementation, the process 900 is further defined such that (i) the multiple sensors include a first sensor and a second sensor, (ii) the first and second sensors are configured to acquire multiple colors, (iii) creating the HDR image includes creating the lower-luminance area component, and (iv) creating the lower-luminance area component includes assembling R, G, and B color values, from the second set, captured from the first sensor and the second sensor to form R, G, and B patterns that can be interpolated using a quincunx algorithm.

In another implementation, the process 900 is further defined such that creating the lower-luminance area component further includes interpolating the formed R, G, and B patterns using the quincunx algorithm.

In another implementation, the process 900 is further defined such that creating the higher-luminance area component further includes using a neutral density filter in front of at least one of the multiple sensors.

In another implementation, the process 900 is further defined such that (i) the multiple sensors include a first sensor, a second sensor, and a third sensor, (ii) the first sensor, the second sensor, and the third sensor are configured to acquire multiple colors, and (iii) creating the color image further includes assembling, for at least the multiple pixel locations, R, G, and B color values, from the first set, captured from the first sensor, the second sensor, and the third sensor.

In another implementation, the process 900 is further defined such that the first sensor is a Bayer-pattern sensor.

In another implementation, the process 900 is further defined such that the multiple sensors include no more than three sensors.

In another implementation, the process 900 is further defined such that the first set of color values overlaps the second set of color values.

In another implementation, the process 900 is further defined such that the three colors are additive.

In another implementation, the process 900 is further defined such that (i) the three colors are R, G, and B, and (ii) the color image is an RGB image.

In another implementation, the process 900 is performed by a camera that includes the lens assembly and the multiple sensors.

In another implementation, an apparatus is provided that includes one or more processors collectively configured to perform the process 900 or a variation of the process 900.

In another implementation, an apparatus is provided that includes structure for performing the operations of the process 900 or a variation of the process 900. The structure includes, for example, one or more processors.

In another implementation, a processor readable medium is provided. The processor readable medium stores instructions for causing one or more processors to collectively perform the process 900 or a variation of the process 900.

In another implementation, an apparatus includes a lens assembly, and multiple sensors arranged to receive light though the lens assembly. A first set of color values captured from the multiple sensors can be assembled to provide three color values for multiple pixel locations. A second set of color values captured from the multiple sensors can be interpolated to provide an HDR image. The apparatus can be used to perform, for example, the process 900 or a variation of the process 900.

In a variation, the multiple sensors include a first sensor, a second sensor, and a third sensor. The first sensor is configured to acquire three colors using a three-color pattern. The second sensor uses a three-color pattern different from the pattern of the first sensor. The third sensor uses a three-color pattern different from the pattern of the first sensor and the pattern of the second sensor.

In a variation, the HDR image includes (i) a higher-luminance area component having pixel values derived from corresponding locations in a first image, and (ii) a lower-luminance area component having pixel values derived from corresponding locations in a second image. The first sensor pattern allows color values captured from the first sensor to be interpolated to provide R, G, and B color values for all interior pixels of the higher-luminance area component. The second sensor pattern and the third sensor pattern allow color values captured from the second sensor and the third sensor to be assembled and interpolated using a quincunx algorithm to provide R, G, and B color values for all interior pixels of the lower-luminance area component. The second sensor pattern and the third sensor pattern allow color values captured from the first sensor, the second sensor, and the third sensor to be assembled to provide captured R, G, and B color values for all interior pixels of an RGB image.

In a variation, the second sensor pattern is 3/8 R, 2/8 G, and 3/8 B.

In a variation, the third sensor pattern is 3/8 R, 2/8 G, and 3/8 B.

In a variation, the second sensor pattern and the third sensor pattern combine to provide the colors that are missing from a Bayer pattern.

In a variation, the three-color pattern of the first sensor is a Bayer-pattern.

In a variation, the apparatus includes a neutral density filter arranged between the lens assembly and one of the multiple sensors.

In a variation, the apparatus includes a neutral density filter arranged between the lens assembly and the first sensor.

In a variation, the three colors are R, G, and B, and the color values can be assembled to form an RGB image.

Figure 10:
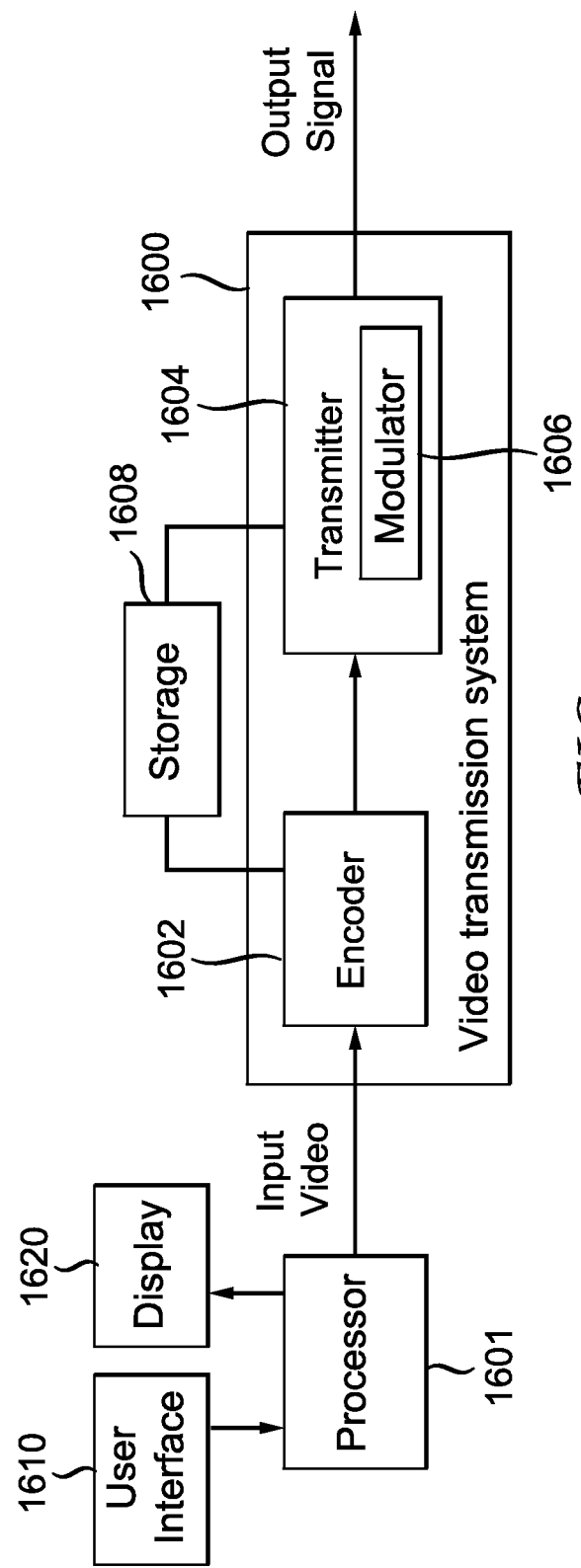
FIG. 10 provides a block diagram depicting an example of a transmission system.

FIG. 10 provides a block diagram depicting an example of a transmission system for use in processing and transmitting images. Referring to FIG. 10, a video transmission system or apparatus 1600 is shown, to which the features and principles described above may be applied. The video transmission system or apparatus 1600 may be, for example, a head-end or transmission system for transmitting a signal using any of a variety of media, such as, for example, satellite, cable, telephone-line, or terrestrial broadcast. The video transmission system or apparatus 1600 also, or alternatively, may be used, for example, to provide a signal for storage. The transmission may be provided over the Internet or some other network. The video transmission system or apparatus 1600 is capable of generating and delivering, for example, video content and other content such as, for example, metadata. It should also be clear that the blocks of FIG. 10 provide a flow diagram of a video transmission process, in addition to providing a block diagram of a video transmission system or apparatus.

The video transmission system or apparatus 1600 receives input video from a processor 1601. In one implementation, the processor 1601 simply provides video images, such as images from a program, to the video transmission system or apparatus 1600. However, in another implementation, the processor 1601 alternatively, or additionally, provides content from other sources to the video transmission system or apparatus 1600. The processor 1601 may also provide metadata to the video transmission system or apparatus 1600, in which the metadata relates, for example, to one or more of the input images, and may include, for example, a description of encoding methods used to encode the data.

The video transmission system or apparatus 1600 includes an encoder 1602 and a transmitter 1604 capable of transmitting the encoded signal. The encoder 1602 receives video information from the processor 1601. The video information may include, for example, video images, and/or other content. The encoder 1602 generates an encoded signal(s) based on the video and/or other information. The encoder 1602 is, in various implementations, a source encoder, a channel encoder, or a combination of a source encoder and a channel encoder. In various implementations, the encoder 1602 is, for example, an AVC encoder (defined elsewhere in this application).

The encoder 1602 may include sub-modules, including for example an assembly unit for receiving and assembling various pieces of information into a structured format for storage or transmission. The various pieces of information may include, for example, encoded or unencoded video, other content, metadata or information, and various elements such as, for example, motion vectors, coding mode indicators, and syntax elements. In some implementations, the encoder 1602 includes the processor 1601 and therefore performs the operations of the processor 1601.

The transmitter 1604 receives the encoded signal(s) from the encoder 1602 and transmits the encoded signal(s) in one or more output signals. The transmitter 1604 may be, for example, adapted to transmit a program signal having one or more bitstreams representing encoded pictures and/or information related thereto. Typical transmitters perform functions such as, for example, one or more of providing error-correction coding (which may alternatively, or additionally, be performed in the encoder 1602), interleaving the data in the signal (which may alternatively, or additionally, be performed in the encoder 1602), randomizing the energy in the signal, and modulating the signal onto one or more carriers using a modulator 1606. The transmitter 1604 may include, or interface with, an antenna (not shown). Further, implementations of the transmitter 1604 may be limited to the modulator 1606.

The video transmission system or apparatus 1600 is also communicatively coupled to a storage unit 1608. In one implementation, the storage unit 1608 is coupled to the encoder 1602, and the storage unit 1608 stores an encoded bitstream from the encoder 1602 and, optionally, provides the stored bitstream to the transmitter 1604. In another implementation, the storage unit 1608 is coupled to the transmitter 1604, and stores a bitstream from the transmitter 1604. The bitstream from the transmitter 1604 may include, for example, one or more encoded bitstreams that have been further processed by the transmitter 1604. The storage unit 1608 is, in different implementations, one or more of a standard DVD, a Blu-Ray disc, a hard drive, or some other storage device.

FIG. 10 also includes a user interface 1610 and a display 1620, both of which are communicatively coupled to the processor 1601. The processor 1601 is communicatively coupled to the user interface 1610 for accepting input from, for example, an operator. The processor 1601 is communicatively coupled to the display 1620 for displaying, for example, digital pictures. Pictures are displayed, in various implementations, before, during, and/or after being processed by the processor 1601.

The display 1620 also includes, in various implementations, the user interface 1610. One implementation uses a touch screen for both the user interface 1610 and the display 1620.

Figure 11:
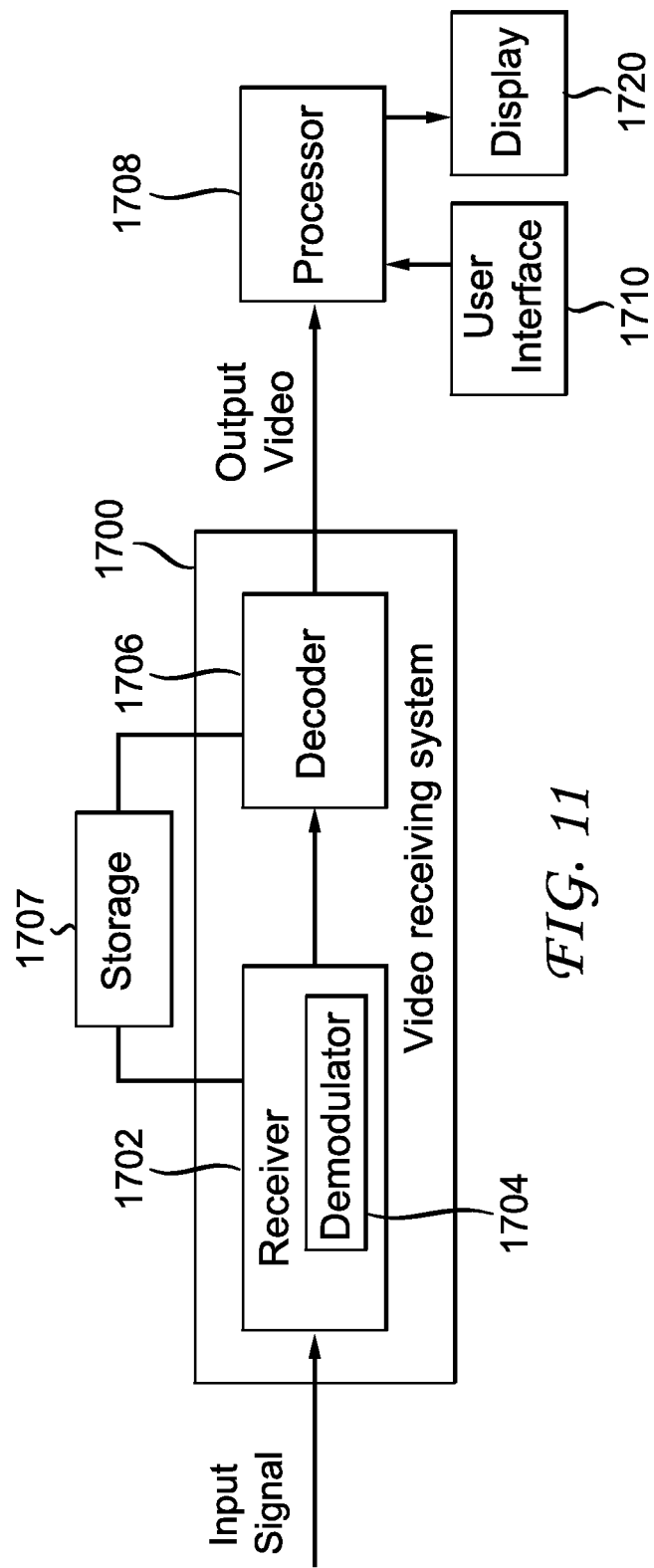
FIG. 11 provides a block diagram depicting an example of a receiving system.

FIG. 11 provides a block diagram depicting an example of a receiving system for use in receiving and processing images. Referring to FIG. 11, a video receiving system or apparatus 1700 is shown to which the features and principles described above may be applied. The video receiving system or apparatus 1700 may be configured to receive signals over a variety of media, such as, for example, satellite, cable, telephone-line, or terrestrial broadcast. The signals may be received over the Internet or some other network. It should also be clear that the blocks of FIG. 11 provide a flow diagram of a video receiving process, in addition to providing a block diagram of a video receiving system or apparatus.

The video receiving system or apparatus 1700 may include, for example, a cell-phone, a computer, a tablet, a router, a gateway, a set-top box, a television, or other device that receives encoded video and provides, for example, decoded video signal for display (display to a user, for example), for processing, or for storage. Thus, the video receiving system or apparatus 1700 may provide its output to, for example, a screen of a television, a screen of a cell phone, a screen of a tablet, a computer monitor, a computer (for storage, processing, or display), or some other storage, processing, or display device.

The video receiving system or apparatus 1700 is capable of receiving and processing video information. The video information may include, for example, video images, other content, and/or metadata. The video receiving system or apparatus 1700 includes a receiver 1702 for receiving an encoded signal, such as, for example, the signals described in the implementations of this application. The receiver 1702 may receive, for example, (i) a signal providing encoded layers for a sequence of pictures in a program, or (ii) a signal output from the video transmission system 1600 (for example, from the storage unit 1608 or the transmitter 1604) of FIG. 10.

The receiver 1702 may be, for example, adapted to receive a program signal having a plurality of bitstreams representing encoded pictures (for example, video pictures or depth pictures). Typical receivers perform functions such as, for example, one or more of receiving a modulated and encoded data signal, demodulating the data signal from one or more carriers using a demodulator 1704, de-randomizing the energy in the signal, de-interleaving the data in the signal (which may alternatively, or additionally, be performed in a decoder), and error-correction decoding the signal (which may alternatively, or additionally, be performed in a decoder). The receiver 1702 may include, or interface with, an antenna (not shown). Implementations of the receiver 1702 may be limited to the demodulator 1704.

The video receiving system or apparatus 1700 includes a decoder 1706. The decoder 1706 is, in various implementations, a source decoder, a channel decoder, or a combination of a source decoder and a channel decoder. In one implementation, the decoder 1706 includes the channel decoder 155 and the source decoder 160 of FIG. 1.

The receiver 1702 provides a received signal to the decoder 1706. The signal provided to the decoder 1706 by the receiver 1702 may include one or more encoded bitstreams. The decoder 1706 outputs a decoded signal, such as, for example, decoded video signals including video information, other content, or metadata. The decoder 1706 may be, for example, an AVC decoder (defined elsewhere in this application).

The video receiving system or apparatus 1700 is also communicatively coupled to a storage unit 1707. In one implementation, the storage unit 1707 is coupled to the receiver 1702, and the receiver 1702 accesses a bitstream from the storage unit 1707 and/or stores a received bitstream to the storage unit 1707. In another implementation, the storage unit 1707 is coupled to the decoder 1706, and the decoder 1706 accesses a bitstream from the storage unit 1707 and/or stores a decoded bitstream to the storage unit 1707. The bitstream accessed from the storage unit 1707 includes, in different implementations, one or more encoded bitstreams. The storage unit 1707 is, in different implementations, one or more of a standard DVD, a Blu-Ray disc, a hard drive, or some other storage device.

The output video from the decoder 1706 is provided, in one implementation, to a processor 1708. The processor 1708 is, in one implementation, a processor configured for presenting decoded digital pictures. In some implementations, the decoder 1706 includes the processor 1708 and therefore performs the operations of the processor 1708. In other implementations, the processor 1708 is part of a downstream device such as, for example, a set-top box or a television.

FIG. 11 also includes a user interface 1710 and a display 1720, both of which are communicatively coupled to the processor 1708. The processor 1708 is communicatively coupled to the user interface 1710 for accepting input from, for example, a user at a home or an operator at a cable hub. The processor 1708 is communicatively coupled to the display 1720 for displaying, for example, digital pictures. Pictures are displayed, in various implementations, before, during, and/or after being processed by the processor 1708.

The display 1720 also includes, in various implementations, the user interface 1710. One implementation uses a touch screen for both the user interface 1710 and the display 1720. Yet further implementations include the user interface 1710 and/or the display 1720 in the video receiving system 1700.

FIGS. 10-11 can be used, in various implementations, to perform all or part of the processes 400, 800, and/or 900, as well as any of the additional features described with respect to the process 900. In various such implementations, the processor 1601 or the processor 1708 are used to perform all or part of the process 400, the process 800, and/or the process 900. The processors 1601 and/or 1708 can receive image information from a camera, or be integrated into a camera.

The display 1620 and/or the display 1720 includes, in various implementations, one or more of a computer display, a laptop display, a tablet display, a cell phone display, a television display, or any of the other displays mentioned in this application or known in the art, including projected displays that may be visible on any surface, such as, for example, a wall, a ceiling, a floor, or a sidewalk.

The user interface 1610 and/or the user interface 1710 includes, in various implementations, one or more of a mouse, a track pad, a keyboard, a touch screen, a microphone for accepting voice commands that are interpreted by the processor 1601 and/or the processor 1708, a remote control, a cell phone, a separate computer whether remote or local, or any other input device mentioned in this application or known in the art.

The storage device 1608 and/or the storage device 1707 includes, in various implementations, any of the storage devices mentioned in this application or known in the art.

The encoder 1602 includes, in various implementations, an AVC or H.264 encoder (defined elsewhere in this application), an encoder for any other standard, or any other encoding device mentioned in this application or known in the art.

The transmitter 1604 includes, in various implementations, an output pin of any integrated circuit, a Universal Asynchronous Receiver/Transmitter (UART), a broadcast transmitter, a satellite transmitter, a cable transmitter, or any other transmitting device mentioned in this application or known in the art. The transmitter 1604 may be, for example, adapted to transmit a program signal having one or more bitstreams representing encoded pictures and/or information related thereto. Typical transmitters perform functions such as, for example, one or more of providing error-correction coding (which may alternatively, or additionally, be performed in the encoder 1602), interleaving the data in the signal (which may alternatively, or additionally, be performed in the encoder 1602), randomizing the energy in the signal, and modulating the signal onto one or more carriers using a modulator. The transmitter 1604 may include, or interface with, an antenna (not shown). Further, implementations of the transmitter 1604 may be limited to a modulator.

This application provides multiple figures, including the pictorial diagrams of FIGS. 2-3 and 5-7, the flow diagrams of FIGS. 4 and 8-9, and the block diagrams of FIGS. 1 and 10-11. Each of these figures provides disclosure for a variety of implementations, as explained briefly for the following examples.

As a first example, we note that the pictorial diagrams certainly present illustrations of various sensor patterns.

However, it should also be clear that the pictorial diagrams describe one or more process flows. For example, at least FIGS. 3 and 5 also describe a process of determining a combined pattern from individual sensors. Further, at least FIGS. 6-7 also describe a process of interpolating missing color values.

As a second example, we note that the flow diagrams certainly describe a flow process. However, it should also be clear that the flow diagrams provide an interconnection between functional blocks of a system or apparatus for performing the flow process. As an example, FIG. 8 also presents a block diagram for performing the functions of the process 800. For example, (i) reference element 810 also represents a block for performing the function of capturing sensor data, (ii) reference element 820 represents a block for performing the function of interpolating, and (iii) the interconnection between elements 810 and 820 represents a coupling between a component for capturing sensor data and a component for performing interpolation on that captured sensor data. Other blocks of FIG. 8 are similarly interpreted in describing this system/apparatus.

As a third example, we note that the block diagrams certainly describe an interconnection of functional blocks of an apparatus or system. However, it should also be clear that the block diagrams provide a description of various process flows. As an example, FIG. 1 also presents a flow diagram for performing various processes that include the functions of the blocks of FIG. 1. For example, (i) the sensors 120, 130, and 140 also represent blocks for performing the process operation of capturing sensor data, (ii) the ND filter 145 also represents a block for performing the process operation of neutral density filtering, and (iii) the interconnection between the ND filter 145 and the first sensor 120 represents a process operation in which a filtered image is provided to a sensor for data capture. Other blocks of FIG. 1 are similarly interpreted in describing this flow process.

We have thus provided a number of implementations. It should be noted, however, that variations of the described implementations, as well as additional applications, are contemplated and are considered to be within our disclosure.

Additionally, features and aspects of described implementations may be adapted for other implementations.

As an example of some envisioned variations, certain implementations include 2 separate arrays of sensors in a single camera. A first array of sensors is used to capture data for generating native RGB images. A second array of sensors is used to capture data for generating HDR images. A beam splitter is controllable to direct light to either the first array of sensors or the second array of sensors.

As another example of some envisioned variations, certain implementations add one or more sensors to the configuration of FIG. 1. The one or more added sensors capture data that is used either to generate an HDR image or to generate a native RGB image, but not both.

As another example of some envisioned variations, certain implementations provide an output image that is both native RGB and HDR. This is accomplished, for example, by using a fourth sensor in the configuration of FIG. 1. The fourth sensor is, for example, a Bayer-pattern sensor and is used with the sensors 130 and 140 to produce a native RGB image. The sensor 120 is used to provide a higher-luminance area component to be inserted, for example, into the native RGB image created from the other three sensors.

As another example of some envisioned variations, several of the implementations may refer to features that are automated or that are performed automatically. Variations of such implementations, however, are not automated and/or do not perform all of part of the features automatically.

As another example of some envisioned variations, several implementations have been described in the context of digital images. For example, the sensors 120, 130, and 140 can capture digital image data. However, other implementations use the sensors to capture analog data that can be stored and/or processed in analog format. The analog information is, of course, converted to digital information in various implementations as well.

As another example of some envisioned variations, in various implementations the sensor pattern color indications apply to a pixel. However, in other implementations, the color indications apply to another size region, such as, for example, a sub-pixel, a partition, a macroblock, or a slice.

Several implementations are able to selectively insert or remove an ND filter. One such implementation is the camera 100, which can selectively remove and insert the ND filter 145. The insertion and/or removal, that is, the control of the filter, is accomplished, for example, by using a slot allowing a user to manually insert and remove the ND filter 145. In another implementation, the ND filter 145 is integral to the camera 100, and the camera 100 includes a switch (manual, or electronic, for example) for controlling the integral ND filter 145. The switch operates, for example, by positioning the integral ND filter 145 so that the ND filter 145 is either in front of the first sensor 120 or not. Other implementations also provide different filters, other than an ND filter, that are controlled in a similar manner.

Various implementations have been described that provide HDR images in which all of the luminance components are captured at the same point in time. For example, implementations of the operation 410 that use the camera 100 will typically capture the image data at the sensors 120, 130, and 140 at the same point in time for each of the sensors 120, 130, and 140. Then, typical implementations will use the image data from the first sensor 120 to generate higher-luminance-area data, and will use the image data from the sensors 130 and 140 to generate the lower-luminance-area data. However, because the higher-luminance-area data and the lower-luminance-area data are generated from image data captured at the same point in time, then the higher-luminance-area data and the lower-luminance-area data also are associated with that same point in time. Other implementations, however, capture image data for an HDR image at different points in time. Similarly, image data captured for producing native RGB images is captured at the same point in time for various implementations, but at different points in time for other implementations.

Several of the implementations and features described in this application may be used in the context of the AVC Standard, and/or AVC with the MVC (Multiview Video Coding) extension (Annex H), and/or AVC with the SVC (Scalable Video Coding) extension (Annex G). Additionally, these implementations and features may be used in the context of another standard (existing or future), or in a context that does not involve a standard. Note that AVC refers to the existing International Organization for Standardization/International Electrotechnical Commission ("ISO/IEC') Moving Picture Experts Group-4 ("MPEG-4") Part 10 Advanced Video Coding ("AVC") standard/International Telecommunication Union, Telecommunication Sector ("ITU-T") H.264 Recommendation (variously referred to throughout this document as the "H.264/MPEG-4 AVC Standard" or variations thereof, such as the "AVC standard", the "H.264 standard", or simply "AVC" or "H.264").

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Various implementations refer to "images" and/or "pictures". The terms "image" and "picture" are used interchangeably throughout this document, and are intended to be broad terms. An "image" or a "picture" may be, for example, all or part of a frame or of a field. The term "video" refers to a sequence of images (or pictures). An image, or a picture, may include, for example, any of various video components or their combinations. Such components, or their combinations, include, for example, luminance, chrominance, Y (of YUV or YCbCr or YPbPr), U (of YUV), V (of YUV), Cb (of YCbCr), Cr (of YCbCr), Pb (of YPbPr), Pr (of YPbPr), red (of RGB), green (of RGB), blue (of RGB), S-Video, and negatives or positives of any of these components. An "image" or a "picture" may also, or alternatively, refer to various different types of content, including, for example, typical two-dimensional video, a disparity map for a 2D video picture, a depth map that corresponds to a 2D video picture, or an edge map. An "image" or a "picture" also refers, for example, to a set of data captured by a sensor, or to the output after processing such a set of data. Such processing includes, for example, filtering the set of data, interpolating the set of data, and/or merging the set of data with another set of data.

Further, many implementations may refer to a "frame". However, such implementations are assumed to be equally applicable to a "picture" or "image". Additionally, various implementations provide images other than RGB images. In particular, various implementations use sets of three additive colors that are different from RGB. For example, red, green, and blue have particular frequencies, and other implementations shift these frequencies to arrive at three different colors that are different from red, green, and blue. Yet other implementations shift only one or two of the colors. In these implementations, the three colors can still be added together to produce other colors, as is commonly done with RGB. Still further implementations, however, use subtractive colors, and instead of using RGB such implementations use, for example, CMY (cyan, magenta, yellow). Yet further implementations are based on color differences, and instead of using RGB such implementations use, for example, YUV or YPbPr.

A "depth map", or "disparity map", or "edge map", or similar terms are also intended to be broad terms. A map generally refers, for example, to a picture that includes a particular type of information. However, a map may include other types of information not indicated by its name. For example, a depth map typically includes depth information, but may also include other information such as, for example, video or edge information.

This application refers to "encoders" and "decoders" in a variety of implementations. It should be clear that an encoder can include, for example, one or more (or no) source encoders and/or one or more (or no) channel encoders, as well as one or more (or no) modulators. Similarly, it should be clear that a decoder can include, for example, one or more (or no) modulators as well as one or more (or no) channel encoders and/or one or more (or no) source encoders.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, many implementations may be implemented in a processor, such as, for example, a post-processor or a pre-processor. The processors discussed in this application do, in various implementations, include multiple processors (sub-processors) that are collectively configured to perform, for example, a process, a function, or an operation. For example, the processors 150, 1601, and 1708, as well as other processing components such as, for example, the encoder 1602, the transmitter 1604, the receiver 1702, and the decoder 1706, are, in various implementations, composed of multiple sub-processors that are collectively configured to perform the operations of that component.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, tablets, portable/personal digital assistants ("PDAs"), and other devices that facilitate communication of information between end-users.

Implementations of the various processes and features described herein may be embodied in a variety of different equipment or applications. Examples of such equipment include a camera, a camcorder, an encoder, a decoder, a post-processor, a pre-processor, a video coder, a video decoder, a video codec, a web server, a television, a set-top box, a router, a gateway, a modem, a laptop, a personal computer, a tablet, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc, or a Blu-Ray disc), a random access memory ("RAM"), a read-only memory ("ROM"), a USB thumb drive, or some other storage device. The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading syntax, or to carry as data the actual syntax-values generated using the syntax rules. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   creating a color image using a first set of color values captured from three sensors that are configured to acquire multiple colors and that use filters having three different color patterns from each other, wherein each pixel location of the color image has a color value for three colors, the three color values being captured from the three sensors, wherein each sensor receives a same amount of luminance from a single lens assembly; and
   creating a high dynamic range ("HDR") image using a second set of color values captured from the three sensors of the single lens assembly wherein:
     the three sensors include a first sensor, a second sensor, and a third sensor, and
     the first sensor is configured to acquire three colors using a three-color pattern,
     the second sensor uses a three-color pattern different from the pattern of the first sensor, and
     the third sensor uses a three-color pattern different from the pattern of the first sensor and the pattern of the second sensor.

2. The method of claim 1 wherein the three different color patterns include (i) a first pattern that includes red ("R"), green ("G"), and blue ("B"), (ii) a second pattern that includes R, G, and B, and (iii) a third pattern that includes R, G, and B.

3. The method of claim 1 wherein creating the HDR image comprises interpolating the second set of color values to have red ("R"), green ("G"), and blue ("B") for each pixel locations of the HDR image.

4. The method of claim 1 wherein creating the HDR image comprises interpolating the second set of color values to have red ("R"), green ("G"), and blue ("B") for all non-edge pixel locations of the HDR image.

5. The method of claim 1 wherein the HDR image comprises:
   a higher-luminance area component having pixel values derived from corresponding locations in a first image; and
   a lower-luminance area component having pixel values derived from corresponding locations in a second image.

6. The method of claim 5 wherein:
   the three sensors include a Bayer-pattern sensor,
   the second set of color values includes color values captured from the Bayer-pattern sensor, and
   creating the HDR image comprises creating the higher-luminance area component by interpolating the color values in the second set of color values captured from the Bayer-pattern sensor.

7. The method of claim 6 wherein creating the higher-luminance area component further comprises using a neutral density filter in front of at least one of the three sensors.

8. The method of claim 5 wherein:
   the three sensors include a first sensor and a second sensor,
   the first and second sensors are configured to acquire multiple colors,
   creating the HDR image comprises creating the lower-luminance area component by assembling red ("R"), green ("G"), and blue ("B") color values, from the second set, captured from the first sensor and the second sensor to form R, G, and B patterns that are interpolated using a quincunx algorithm.

9. The method of claim 5 wherein a first sensor pattern allows color values captured from the first sensor to be interpolated to provide red ("R"), green ("G"), and blue ("B") color values for all interior pixels of the higher-luminance area component, a second sensor pattern and a third sensor pattern allow color values captured from the second sensor and the third sensor to be assembled and interpolated using a quincunx algorithm to provide R, G, and B color values for all interior pixels of the lower-luminance area component, and the second sensor pattern and the third sensor pattern allow color values captured from the first sensor, the second sensor, and the third sensor to be assembled to provide captured R, G, and B color values for all interior pixels of an RGB image.

10. The method of claim 1 wherein: the three colors are red ("R"), green ("G"), and blue ("B"), and the color values can be assembled to form an RGB image.

11. The method of claim 1 wherein the method is performed by a camera.

12. An apparatus comprising:
a single lens assembly;
three sensors that receive a same amount of luminance from the single lens assembly and are configured to acquire multiple colors using filters that have three different color patterns from each other, wherein the three sensors capture a first set of color values to create a color image, wherein each pixel location of the color image has a color value for three colors; and
a processor that creates an HDR image using a second set of color values captured from the three sensors wherein:
the three sensors include a first sensor, a second sensor, and a third sensor, and
the first sensor is configured to acquire three colors using a three-color pattern,
the second sensor uses a three-color pattern different from the pattern of the first sensor, and
the third sensor uses a three-color pattern different from the pattern of the first sensor and the pattern of the second sensor.

13. The apparatus of claim 12 wherein:
the HDR image comprises (i) a higher-luminance area component having pixel values derived from corresponding locations in a first image, and (ii) a lower-luminance area component having pixel values derived from corresponding locations in a second image.

14. The apparatus of claim 13 wherein:
the three sensors include a Bayer pattern sensor,
the second set of color values includes color values captured from the Bayer-pattern sensor, and
creating the HDR image comprises creating the higher-luminance area component by interpolating the color values in the second set of color values captured from the Bayer-pattern sensor.

15. The apparatus of claim 14 wherein creating the higher-luminance area component further comprises using a neutral density filter arranged between the lens assembly and one of the three sensors.

16. The apparatus of claim 13 wherein
the three sensors include a first sensor and a second sensor,
the first and second sensors are configured to acquire multiple colors, and
creating the HDR image comprises creating the lower-luminance area component by assembling red ("R"), green ("G"), and blue ("B") color values, from the second set, captured from the first sensor and the second sensor to form R, G, and B patterns that are interpolated using a quincunx algorithm.

17. The apparatus of claim 13 wherein
a first sensor pattern allows color values captured from the first sensor to be interpolated to provide red ("R"), green ("G"), and blue ("B") color values for all interior pixels of the higher-luminance area component,
a second sensor pattern and a third sensor pattern allow color values captured from the second sensor and the third sensor to be assembled and interpolated using a quincunx algorithm to provide R, G, and B color values for all interior pixels of the lower-luminance area component, and
the second sensor pattern and the third sensor pattern allow color values captured from the first sensor, the second sensor, and the third sensor to be assembled to provide captured R, G, and B color values for all interior pixels of an RGB image.

18. The apparatus of claim 12 wherein creating the HDR image comprises interpolating the second set of color values to have red ("R"), green ("G"), and blue ("B") for each pixel locations of the HDR image.

19. The apparatus of claim 12 wherein wherein creating the HDR image comprises interpolating the second set of color values to have red ("R"), green ("G"), and blue ("B") for all non-edge pixel locations of the HDR image.

20. The apparatus of claim 12 wherein:
the three colors are red ("R"), green ("G"), and blue ("B"), and the color values can be assembled to form an RGB image.

21. The apparatus of claims 12 wherein the apparatus is a camera.

* * * * *